(12) United States Patent
Sano et al.

(10) Patent No.: US 10,344,117 B2
(45) Date of Patent: *Jul. 9, 2019

(54) EPOXY RESIN COMPOSITION, PREPREG, AND FIBER REINFORCED COMPOSITE MATERIAL

(71) Applicant: TORAY INDUSTRIES, INC., Tokyo (JP)

(72) Inventors: Kentaro Sano, Ehime (JP); Reo Takaiwa, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 15/549,527

(22) PCT Filed: Nov. 27, 2015

(86) PCT No.: PCT/JP2015/083361
§ 371 (c)(1),
(2) Date: Aug. 8, 2017

(87) PCT Pub. No.: WO2016/129167
PCT Pub. Date: Aug. 18, 2016

(65) Prior Publication Data
US 2018/0022862 A1    Jan. 25, 2018

(30) Foreign Application Priority Data

Feb. 9, 2015  (JP) ................................ 2015-022915
Feb. 9, 2015  (JP) ................................ 2015-022916
Feb. 9, 2015  (JP) ................................ 2015-022917

(51) Int. Cl.

| | | |
|---|---|---|
| B32B 27/38 | (2006.01) |
| B32B 27/26 | (2006.01) |
| B32B 27/04 | (2006.01) |
| C08J 5/24 | (2006.01) |
| C08G 59/32 | (2006.01) |
| C08G 59/38 | (2006.01) |
| C08G 59/40 | (2006.01) |
| C08L 63/00 | (2006.01) |
| C08L 63/04 | (2006.01) |
| C08G 59/02 | (2006.01) |
| C08K 7/06 | (2006.01) |

(52) U.S. Cl.
CPC ......... C08G 59/4021 (2013.01); C08G 59/02 (2013.01); C08J 5/24 (2013.01); C08K 7/06 (2013.01); C08L 63/00 (2013.01); C08J 2363/00 (2013.01); C08J 2363/04 (2013.01)

(58) Field of Classification Search
None
See application file for complete search history.

(56) References Cited

U.S. PATENT DOCUMENTS

| 6,232,426 | B1 * | 5/2001 | Orikabe | ................. C08G 59/66 528/90 |
| 6,410,127 | B1 * | 6/2002 | Kamae | .................. C08G 59/18 428/297.4 |
| 9,982,086 | B2 * | 5/2018 | Hughes | ....................... C08J 5/24 |
| 2007/0021582 | A1 * | 1/2007 | Amano | .................. C08G 59/18 528/109 |
| 2013/0172098 | A1 | 7/2013 | Shiga et al. | |

(Continued)

FOREIGN PATENT DOCUMENTS

| JP | 09157498 A | 6/1997 |
| JP | 10182793 A | 7/1998 |

(Continued)

OTHER PUBLICATIONS

Machine translation of JP-2002266172-A (no date).*
Machine translation of JP 2002284852-A (no date).*
International Search Report and Written Opinion for International Application No. PCT/JP2015/083361, dated Jan. 26, 2016—7 Pages.

*Primary Examiner* — Michael J Feely
(74) *Attorney, Agent, or Firm* — RatnerPrestia

(57) ABSTRACT

An epoxy resin composition includes [A] an epoxy resin, [B] dicyandiamide, [C] an aromatic urea and [D] a boric acid ester and satisfies any one of (i) requirements [a] and [b], (ii) requirements [c] and [d] and (iii) requirements [c] and [e]:[a]: the time from when the temperature reaches 100° C. till when the heat flow reaches a peak top is 60 minutes or shorter as determined by a differential scanning calorimetry; [b]: the time from when the temperature reaches 60° C. till when the heat flow reaches a peak top is 25 hours or longer as determined by a differential scanning calorimetry; [c]: the average in all of the epoxy resins is 165 to 265 g/eq inclusive; [d]: in the component [A], [A1] a resin represented by formula (I) and/or a resin represented by formula (II) is contained in an amount of 10 to 50 parts by mass relative to the total amount of all of the epoxy resins; and [e]: in the component [A], [A2] a glycidylamine-type resin having a functionality of 3 or higher is contained in an amount of 10 to 50 parts by mass relative to the total amount of all of the epoxy resins.

8 Claims, No Drawings

(56) References Cited

U.S. PATENT DOCUMENTS

| | | | | |
|---|---|---|---|---|
| 2014/0045973 A1* | 2/2014 | Bharadwaj | ............... | C08K 5/55 |
| | | | | 523/400 |
| 2014/0079944 A1* | 3/2014 | Higeshiro | ............ | C09D 167/02 |
| | | | | 428/327 |
| 2016/0002390 A1* | 1/2016 | Hughes | ...................... | C08J 5/24 |
| | | | | 523/427 |

FOREIGN PATENT DOCUMENTS

| | | | | | |
|---|---|---|---|---|---|
| JP | 10330513 | A | | 12/1998 | |
| JP | 2002266172 | A * | 9/2002 | | ............... D01F 9/22 |
| JP | 2002284852 | A | | 10/2002 | |
| JP | 2003301029 | A | | 10/2003 | |
| JP | 2004075914 | A | | 3/2004 | |
| JP | 2005225982 | A | | 8/2005 | |
| JP | 2013139511 | A | | 7/2013 | |
| JP | 2014167102 | A | | 9/2014 | |
| JP | 2014167103 | A | | 9/2014 | |
| WO | WO-2014107725 | A1 * | 7/2014 | | ................ C08J 5/24 |

\* cited by examiner

//EPOXY RESIN COMPOSITION, PREPREG, AND FIBER REINFORCED COMPOSITE MATERIAL

CROSS REFERENCE TO RELATED APPLICATIONS

This is the U.S. National Phase application of PCT International Application No. PCT/JP2015/083361, filed Nov. 27, 2015, and claims priority to Japanese Patent Application No. 2015-022915, filed Feb. 9, 2015, Japanese Patent Application No. 2015-022916, filed Feb. 9, 2015, and Japanese Patent Application No. 2015-022917, filed Feb. 9, 2015, the disclosures of each of these applications being incorporated herein by reference in their entireties for all purposes.

FIELD OF THE INVENTION

The present invention relates to an epoxy resin composition adapted for use as matrix resin of a fiber reinforced composite material suitable for sport applications and general industry applications, and also relates to a prepreg and a fiber reinforced composite material prepared by using such an epoxy resin composition as matrix resin.

BACKGROUND OF THE INVENTION

Epoxy resins have excellent mechanical characteristics, and therefore, they are used in various industrial applications including coating compositions, adhesives, electric and electronic information materials, and advanced composite materials. Epoxy resins are widely used particularly in fiber reinforced composite materials composed mainly of a reinforcement fiber, such as carbon fiber, glass fiber, and aramid fiber, combined with a matrix resin.

Use of a prepreg produced by impregnating an epoxy resin in a carbon fiber substrate is popular in the production of fiber reinforced composite materials. The prepreg is laminated or preformed, and then heated to cure the epoxy resin, thereby producing a molded article. The property primarily required for a prepreg is the ability to provide a molded article exhibiting good mechanical characteristics, and recently in particular, other characteristics such as high productivity, namely, high curing speed are also required. This trend is prominent in industrial applications such as automobile applications where a high productivity is strongly needed.

In addition, currently available prepregs are required to be reactive at room temperature and normally freezable for storage. This requires preliminary arrangement of a freezer installation and thawing before use, and accordingly, there are demands for prepregs having improved storage stability to enable storage and easy handling at room temperature.

As techniques for improving storage stability, Patent Document 1 discloses a method for coating the surface of size-controlled imidazole derivative particles with a boric ester compound, and also describes that both high storage stability and curability can be realized simultaneously.

Patent document 2 describes that an epoxy resin composition with long term storage stability can be obtained by controlling the hydrolysable chlorine content in the epoxy resin in an appropriate range.

Patent Document 3 discloses a method designed to control the time period from the curing start temperature until reaching a certain degree of curing and adopt a curing agent having a limited particle size and a limited curing start temperature, and describes that both high storage stability and high curing speed were realized simultaneously.

PATENT DOCUMENTS

Patent document 1: Japanese Unexamined Patent Publication (Kokai) No. HEI 9-157498
Patent document 2: Japanese Unexamined Patent Publication (Kokai) No. 2003-301029
Patent document 3: Japanese Unexamined Patent Publication (Kokai) No. 2004-75914

SUMMARY OF THE INVENTION

However, because of using a highly active imidazole derivative, the method described in Patent document 1 can lead to a loss of long term storage stability in some cases due to heat history during the mixing of the resins, preparation of the prepreg, and the storage and transport of the prepreg.

Although Patent documents 2 and 3 list some resin compositions having relatively high storage stability, furthermore, they cannot be said to have sufficient storage stability. They contain no descriptions on the elastic modulus or deflection of cured resins, which represent important features of the mechanical characteristics of carbon fiber composite materials.

Accordingly, an object of the present invention is to provide an epoxy resin composition and a prepreg which simultaneously realize stability against heat history during production processes, storage, and transport, as well as storage stability at high level, and another object is to provide an epoxy resin composition which is capable of forming a fiber reinforced composite material having excellent mechanical characteristics.

After making an intensive study aiming to solve the problems described above, the inventors of the present invention found an epoxy resin composition having the following constitution and arrived at the present invention on the bases of the finding. Specifically, the epoxy resin composition of the present invention includes the embodiments described below.

An epoxy resin composition including component [A], which is an epoxy resin, component [B], which is dicyandiamide, component [C], which is an aromatic urea compound, and component [D], which is a boric ester, and fulfilling any of the conditions from (i) to (iii) given below:
(i) to meet requirement [a] and requirement [b],
(ii) to meet requirement [c] and requirement [d], and
(iii) to meet requirement [c] and requirement [e],
where requirements [a] to [e] are as follows:
[a]: the time period after reaching 100° C. until reaching the peak top in the heat flow curve is 60 minutes or shorter when an epoxy resin composition is analyzed in an nitrogen stream at a constant temperature of 100° C. using a differential scanning calorimeter,
[b]: the time period after reaching 60° C. until reaching the peak top in the heat flow curve is 25 hours or longer when an epoxy resin composition is analyzed in an nitrogen stream at a constant temperature of 60° C. using a differential scanning calorimeter,
[c]: the average epoxy equivalent over all epoxy resins is 165 g/eq or more and 265 g/eq or less,
[d]: component [A] contains an epoxy resin [A1] that is represented by formula (I) and/or formula (II) and accounts for 10 parts by mass to 50 parts by mass of the total epoxy resin quantity, which represents 100 parts by mass:

[Chemical compound 1]

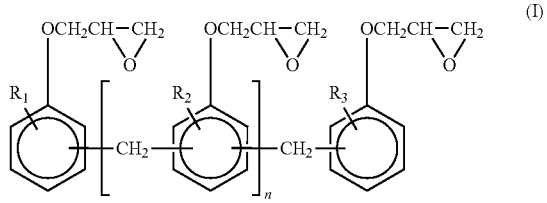

wherein $R_1$, $R_2$, and $R_3$ each are a hydrogen atom or a methyl group, and n is an integer of 1 or greater,

[Chemical compound 2]

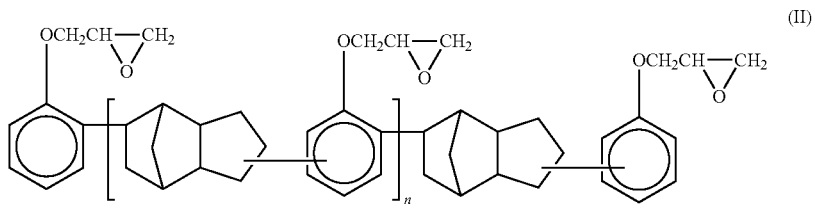

wherein n is an integer of 1 or greater, and

[e]: component [A] contains a tri- or higher functional glycidyl amine type epoxy resin [A2] that accounts for 10 parts by mass to 50 parts by mass of the total epoxy resin quantity, which represents 100 parts by mass.

The prepreg according to the present invention is one including the aforementioned epoxy resin composition and carbon fiber.

The fiber reinforced composite material according to the present invention is a fiber reinforced composite material obtained by curing the aforementioned prepreg.

The present invention can provide an epoxy resin composition that shows stability against heat history during production processes, storage, and transport, as well as very high storage stability, and that serves to provide prepreg from which a fiber reinforced composite material having good mechanical characteristics can be produced, and can also provide a prepreg and fiber reinforced composite material produced from the epoxy resin composition.

DESCRIPTION OF PREFERRED EMBODIMENTS

The epoxy resin composition according to embodiments of the present invention includes component [A], which is an epoxy resin, component [B], which is dicyandiamide, and component [C], which is an aromatic urea compound, and component [D], which is a boric ester, as its critical components. First, each of the components is described below.

(Component [A])

Component [A] for an embodiment of the present invention is an epoxy resin. Examples thereof include glycidyl ether type epoxy resins such as bisphenol A type epoxy resins, bisphenol F type epoxy resins, bisphenol S type epoxy resins, biphenyl type epoxy resins, naphthalene type epoxy resins, novolac type epoxy resins, epoxy resins having fluorene backbones, epoxy resins formed from copolymers of a phenol compound and dicyclopentadiene, diglycidyl resorcinol, tetrakis(glycidyloxy phenyl)ethane, and tris(glycidyloxy phenyl)methane; and glycidylamine type epoxy resins such as tetraglycidyl diaminodiphenylmethane, triglycidyl aminophenol, triglycidyl aminocresol, and tetraglycidyl xylene diamine. These epoxy resins may be used singly or as a combination of a plurality thereof.

Component [A] preferably contains a tri- or higher polyfunctional epoxy resin. The presence of a tri- or higher polyfunctional epoxy resin serves to produce an epoxy resin composition having both very high storage stability and a high curing speed.

From the viewpoint of the balance among the curing speed, storage stability, and mechanical characteristics of cured products, such a tri- or higher polyfunctional epoxy resin is preferably an epoxy resin as represented by the undermentioned formula (I) and/or formula (II), i.e., component [A1]. Component [A1] is one generally known as phenol novolac type epoxy resin, cresol novolac type epoxy resin, or dicyclopentadiene type epoxy resin, and commercially available in the form of a mixture of bi- or more polyfunctional epoxy resins.

From the viewpoint of the balance between storage stability and curing speed, the epoxy resins contained in component [A1] preferably account for 10 parts by mass to 50 parts by mass of the total epoxy resin quantity, which represents 100 parts by mass, in the epoxy resin composition. From the viewpoint of the curing speed, furthermore, it is desirable for the tri- or higher polyfunctional epoxy resins in component [A1] to account for as large proportion as possible, and from this viewpoint, it is preferable for the epoxy groups in component [A1] to contain an average of 3.0 or more functional groups.

[Chemical compound 3]

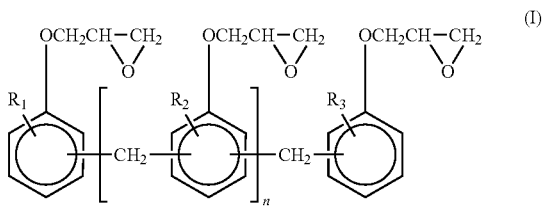

wherein $R_1$, $R_2$, and $R_3$ each are a hydrogen atom or a methyl group, and n is an integer of 1 or greater.

[Chemical compound 4]

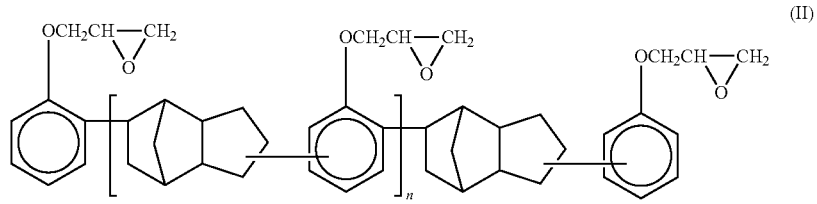

(II)

Here, n is an integer of 1 or greater.

Commercially available products of component [A1] include jER (registered trademark) 152, 154, and 180S (all manufactured by Mitsubishi Chemical Corporation), Epicron (registered trademark) N-740, N-770, N-775, N-660, N-665, N-680, N-695, HP7200L, HP7200, HP7200H, HP7200HH, and HP7200HHH (all manufactured by DIC), PY307, EPN1179, EPN1180, ECN9511, ECN1273, ECN1280, ECN1285, and ECN1299 (all manufactured by Huntsman Advanced Materials), YDPN638, YDPN638P, YDCN-701, YDCN-702, YDCN-703, and YDCN-704 (all manufactured by Tohto Kasei Co., Ltd.), and DEN431, DEN438, and DEN439 (all manufactured by The Dow Chemical Company).

Such a tri- or higher polyfunctional epoxy resin that is contained is preferably a tri- or higher functional glycidyl amine type epoxy resin, i.e., component [A2].

Specific examples of component [A2] include tetraglycidyl diaminodiphenyl methane, triglycidyl aminophenol, triglycidyl aminocresol, and tetraglycidyl xylylene diamine.

Commercially available products of tetraglycidyl diaminodiphenyl methane that can serve as component [A2] include Sumiepoxy (registered trademark) ELM434 (manufactured by Sumitomo Chemical Co., Ltd.), YH434L (manufactured by Tohto Kasei Co., Ltd.), jER (registered trademark) 604 (manufactured by Mitsubishi Chemical Corporation), and Araldite (registered trademark) MY720 and MY721 (manufactured by Huntsman Advanced Materials). Useful products of triglycidyl aminophenols and triglycidyl aminocresol include Sumiepoxy (registered trademark) ELM100 and ELM120 (manufactured by Sumitomo Chemical Co., Ltd.), Araldite (registered trademark) MY0500, MY0510, and MY0600 (manufactured by Huntsman Advanced Materials), and jER (registered trademark) 630 (manufactured by Mitsubishi Chemical Corporation). Useful products of tetraglycidyl xylylene diamine and hydrogenated compounds thereof include Tetrad (registered trademark)-X and Tetrad (registered trademark) -C (manufactured by Mitsubishi Gas Chemical Co., Inc.).

From the viewpoint of the balance between storage stability and curing speed, the epoxy resins contained in component [A2] preferably account for 10 parts by mass to 50 parts by mass of the total epoxy resin quantity, which represents 100 parts by mass.

From the viewpoint of the balance between the storage stability and elastic modulus of cured resins, a bisphenol F type epoxy resin, i.e., component [A3], may be contained as component [A]. Component [A3] preferably accounts for 20 parts by mass to 90 parts by mass of the total epoxy resin quantity, which represents 100 parts by mass.

Commercially available products of component [A3] include jER (registered trademark) 806, 807, 4002P, 4004P, 4007P, and 4009P (all manufactured by Mitsubishi Chemical Corporation) and Epotohto (registered trademark) YDF-2001 and YDF-2004 (both manufactured by Tohto Kasei Co., Ltd.).

For the invention described in the present application, it is preferable for the average epoxy equivalent over all epoxy resins to be 165 g/eq or more and 265 g/eq or less from the viewpoint of the balance between the storage stability and curing speed. The storage stability at room temperature is often insufficiently low if the average epoxy equivalent over all epoxy resins is less than 165 g/eq. The curing speed can often be insufficiently low or cured resins can often have poor mechanical characteristics if the average epoxy equivalent over all epoxy resins is more than 265 g/eq.

The average epoxy equivalent over all epoxy resins can be calculated by the method described below.

(Average Epoxy Equivalent Over all Epoxy Resins)

In the case where n types of epoxy resins are contained together and epoxy resin X with an epoxy equivalent of Ex (g/eq) accounts for Wx parts by mass, the average epoxy equivalent over all epoxy resins can be calculated by the following equation (1) (here x=1, 2, 3, ..., n):

[Formula 1]

$$\text{average epoxy equivalent over all epoxy resins } [g/eq] = \frac{W_1 + W_2 \ldots + W_x \ldots + W_n}{\left\{\left(\frac{W_1}{E_1}\right) + \left(\frac{W_2}{E_2}\right) \ldots + \left(\frac{W_x}{E_x}\right) \ldots + \left(\frac{W_n}{E_n}\right)\right\}} \quad (1)$$

(Component [B])

For an embodiment of the present invention, component [B] is dicyandiamide. The dicyandiamide is a compound represented by the chemical formula $(H_2N)_2C=N-CN$. The dicyandiamide is widely used as a curing agent for epoxy resins because of its excellent ability to produce cured resins with good mechanical characteristics and high heat resistance. Examples of commercially available dicyandiamide products include DICY7 and DICY15 (manufactured by Mitsubishi Chemical Corporation).

Incorporation of dicyandiamide [B] in the form of powder is preferable from the viewpoint of its storage stability at room temperature and viscosity stability during prepreg production. Preliminary dispersion of dicyandiamide [B] in a part of the epoxy resin in component [A] by using a three roll mill and the like is preferable from the viewpoint of producing a consistent epoxy resin composition, leading to cured articles with improved physical characteristics.

When the dicyandiamide is contained in the resin as powder, the average particle size is preferably 10 μm or less, and more preferably 7 μm or less. For example, when reinforcement fiber bundles are impregnated with an epoxy resin composition by applying heat and pressure in the course of prepreg production, impregnation of the epoxy resin composition in fiber bundles can be facilitated by the use of dicyandiamide having an average particle size of 10 µm or less.

The total content of the dicyandiamide component [B] is preferably such that 0.3 to 1.2 equivalents, more preferably 0.3 to 0.7 equivalent, of active hydrogen groups are present relative to the epoxy groups contained in all epoxy resin components in the epoxy resin composition. When the quantity of active hydrogen groups is in this range, it will be possible to obtain cured resin having heat resistance and mechanical characteristics in a good balance.

The combined use of the dicyandiamide component [B] with the undermentioned component [C] serves to provide a resin composition having a lower curing temperature as compared with the single use of component [B]. For an embodiment of the present invention, the combined use of component [B] and component [C] is essential to obtain a favorable curing speed.

(Component [C])

It is essential for the epoxy resin composition according to an embodiment of the present invention to contain an aromatic urea compound as component [C]. Component [C] acts as a curing accelerator and serves to obtain a favorable curing speed when used in combination with component [B].

Specific examples of the aromatic urea compound used as component [C] include 3-(3,4-dichlorophenyl)-1,1-dimethylurea, 3-(4-chlorophenyl)-1,1-dimethylurea, phenyl-dimethylurea, and toluene bis-dimethylurea. Commercially available products of the aromatic urea compound include DCMU-99 (manufactured by Hodogaya Chemical Co., Ltd.) and Omicure (registered trademark) 24 (manufactured by PTI Japan).

The aromatic urea compound used as component [C] preferably accounts for 1 to 8 parts by mass, more preferably 1.5 to 6 parts by mass, and still more preferably 2 to 4 parts by mass, relative to 100 parts by mass of the epoxy resin used as component [A]. A content of component [C] in this range serves to obtain an epoxy resin composition that can form a cured resin having storage stability and curing speed in a good balance and exhibiting good physical characteristics.

Here, although component [C] is known to be a curing accelerator having a relatively high storage stability, it can undergo a slow reaction with the epoxy resin at room temperature and therefore, cannot always show a good long term storage stability. There are many theories about the mechanism of the reaction between the epoxy resin and component [C], and some studies have proposed a mechanism in which a free amine compound resulting from the decomposition of the urea group reacts with the epoxy resin. Regarding the reasons for failing to obtain a long term stability at room temperature, the present inventors considered as follows. Specifically, since the dissociation reaction of the urea group is a reversible reaction, the epoxy resin composition having component [C] contains a slight amount of the amine compound in a free state. On the contrary, the nucleophilic reaction between the amine compound and the epoxy resin is an irreversible reaction. Most of the free amine compounds return to urea through the reversible reaction, but if part of the remainder reacts with epoxy groups, a crosslinking reaction will progress irreversibly. It was considered that the repetition of this process leads to a resin composition with a reduced long term stability. Accordingly, the combined use with the undermentioned component [D] is required to ensure a very high storage stability.

(Component [D])

It is essential for the epoxy resin composition according to an embodiment of the present invention to contain a boric ester compound as component [D]. The combined use of component [C] and component [D] works to depress the reaction between component [C] and the epoxy resin at a storage temperature, leading to a prepreg having a considerably improved storage stability. Although the mechanism has not been clarified, it is considered that since component [D] has Lewis acidity, the amine compound isolated from component [C] and component [D] react with each other, making the amine compound less reactive.

Furthermore, the combined use of component [C] and component [D] enables the production of a resin composition having stability against heat history. There have been known techniques for stabilization of amine compounds by using component [D] (for example, as described in Patent document 1), but they are intended to stabilize amine compounds that are highly reactive with epoxy resins. Heating of a resin composition is performed in some steps such as for preparing a resin composition or impregnating reinforcement fiber in producing prepreg by combining it with reinforcement fiber, but the combined use of a highly reactive amine compound and component [D] cannot serve to achieve a stability against heat history. On the other hand, when component [C] and component [D] are used in combination as proposed for the present application, the quantity of the amine compound isolated from component [C] is limited, leading to higher stability against heat history as compared with cases where component [C] is used singly. From this viewpoint, too, it is necessary to use component [C] and component [D] in combination.

Specific examples of the boric ester used as component [D] include alkyl borates such as trimethyl borate, triethyl borate, tributyl borate, tri-n-octyl borate, tri(triethylene glycol methyl ether) borate, tricyclohexyl borate, and trimenthyl borate; aromatic borates such as tri-o-cresyl borate, tri-m-cresyl borate, tri-p-cresyl borate, and triphenyl borate; and others such as tri(1,3-butanediol) biborate, tri(2-methyl-2,4-pentanediol) biborate, and trioctylene glycol diborate.

The boric ester used may also be a cyclic boric ester having a cyclic structure in its molecule. Examples of the cyclic boric ester include tris-o-phenylene bisborate, bis-o-phenylene pyroborate, bis-2,3-dimethylethylene phenylene pyroborate, and bis-2,2-dimethyltrimethylene pyroborate.

Commercial products that contain such boric esters include Cureduct (registered trademark) L-01B (manufactured by Shikoku Chemicals Corporation) and Cureduct (registered trademark) L-07N (manufactured by Shikoku Chemicals Corporation).

Component [D] described above preferably accounts for 0.1 to 8 parts by mass, more preferably 0.15 to 5 parts by mass, and still more preferably 0.2 to 4 parts by mass, relative to 100 parts by mass of the epoxy resin used as component [A]. A content of component [D] in this range serves to obtain an epoxy resin composition that can form a cured resin having storage stability and curing speed in a good balance and exhibiting good physical characteristics.

(Analysis of the Epoxy Resin Composition Using a Differential Scanning Calorimeter)

For the present invention, the curing speed of the epoxy resin composition is measured by, for example, using a differential scanning calorimeter.

The exotherm that can be observed with a differential scanning calorimeter is attributed to the reaction of the epoxy resin composition. Accordingly, the time period elapsing before the start of heat generation in isothermal measurement has a relation with the reaction speed of the epoxy resin composition. The time of the exothermic peak top appearance in isothermal measurement indicates that the reaction is occurring most actively at the temperature, and this can be used as an indicator of the reactivity.

(Isothermal Measurement of the Epoxy Resin Composition at 100° C. Using a Differential Scanning Calorimeter)

When the epoxy resin composition according to the present invention is subjected to isothermal measurement at 100° C. by using a differential scanning calorimeter, the time period after reaching 100° C. until reaching the top of the exothermic peak in the heat flow curve, which is designated as T(100), is preferably 60 minutes or less, more preferably 45 minutes or less, and still more preferably 30 minutes or less. The use of an epoxy resin composition with a T(100) of 60 minutes or less as the matrix resin ensures a high curing speed in a range where productivity is not impaired. Prepreg produced from an epoxy resin composition with a T(100) of more than 60 minutes used as the matrix resin will fail to have a sufficiently high curing speed.

(Isothermal Measurement of the Epoxy Resin Composition at 60° C. Using a Differential Scanning Calorimeter)

When the epoxy resin composition according to the present invention is subjected to isothermal measurement at 60° C., the time period after reaching 60° C. until reaching the top of the exothermic peak in the heat flow curve, which is designated as T(60), is preferably 25 hours or more, more preferably 28 hours or more. The use of an epoxy resin composition with a T(60) of 25 hours or more as the matrix resin enables the production of prepreg having long term storage stability. Prepreg produced from an epoxy resin composition with a T(60) of less than 25 hours as the matrix resin will fail to have a sufficiently high storage stability at room temperature.

It is necessary for the resin composition according to embodiments of the present invention to fulfill any of the undermentioned conditions from (i) to (iii):
(i) to meet requirement [a] and requirement [b],
(ii) to meet requirement [c] and requirement [d],
(iii) to meet requirement [c] and requirement [e],
where requirements [a] to [e] are as follows:
[a]: the epoxy resin composition has a T (100) of 60 minutes or less,
[b]: the epoxy resin composition has a T (60) of 25 hours or more,
[c]: the average epoxy equivalent over all epoxy resins is 165 g/eq or more and 265 g/eq or less,
[d]: component [A] contains component [A1], which accounts for 10 parts by mass to 50 parts by mass of the total epoxy resin quantity, which represents 100 parts by mass, and
[e]: component [A] contains component [A2], which accounts for 10 parts by mass to 50 parts by mass of the total epoxy resin quantity, which represents 100 parts by mass.

If containing component [A], which is an epoxy resin, component [B], which is dicyandiamide, component [C], which is an aromatic urea compound, and component [D], which is a boric ester, and fulfilling any of the conditions from (i) to (iii) given above, an epoxy resin composition can form a cured resin having storage stability and curing speed in a good balance and exhibiting good physical characteristics.

(Component [E])

The epoxy resin composition according to the present invention may also contain a thermoplastic resin as component [E] to an extent not adversely affecting the advantageous effects of the present invention. While the thermoplastic resin is not a critical component for the present invention, the incorporation of the epoxy resin composition enables the control of the viscoelasticity and the production of a cured article having toughness.

Examples of the thermoplastic resin include polymethyl methacrylate, polyvinyl formal, polyvinyl butyral, polyvinyl acetal, polyvinyl pyrrolidone, a polymer containing at least 2 members selected from aromatic vinyl monomer, cyanated vinyl monomer, and rubbery polymer as its constituents, polyamide, polyester, polycarbonate, polyarylene oxide, polysulfone, polyethersulfone, and polyimide. Examples of the polymer containing at least 2 members selected from aromatic vinyl monomer, cyanated vinyl monomer, and rubbery polymer as its constituents include acrylonitrile-butadiene-styrene copolymers (ABS resin) and acrylonitrile-styrene copolymers (AS resin). The polysulfone and the polyimide may have an ether bond or amide bond in its backbone chain.

The polymethyl methacrylate, polyvinyl formal, polyvinyl butyral, and polyvinyl pyrrolidone are preferable since they have high compatibility with many epoxy resins including bisphenol A type epoxy resin and novolac type epoxy resin and contribute to efficient control of the flowability of the epoxy resin composition. The most preferred is polyvinyl formal. Examples of commercially available products of these thermoplastic resins include Denka Butyral (registered trademark), Denka Formal (registered trademark) (manufactured by Denki Kagaku Kogyo Kabushiki Kaisha), and Vinylec (registered trademark) (manufactured by JNC Corporation).

In the case of polymers of polysulfone, polyether sulfone, or polyimide, the resins themselves have high heat resistance. These polymers have a resin backbone moderately compatible with glycidylamine type epoxy resins such as tetraglycidyl diaminodiphenylmethane, triglycidyl aminophenol, triglycidyl aminocresol, and tetraglycidyl xylenediamine, which represent epoxy resins that are widely used in applications requiring heat resistance such as structural members of aircraft. In addition, the use of these resins enables efficient control of the flowability of epoxy resin compositions. They are also preferred because they have the effect of improving impact strength of fiber reinforced resin composite materials. Examples of polysulfone polymers include Radel (registered trademark) A (manufactured by Solvay Advanced Polymers) and Sumikaexcel (registered trademark) PES (manufactured by Sumitomo Chemical Company, Limited), and examples of polyimide polymers include Ultem (registered trademark) (manufactured by GE Plastics) and Matrimid (registered trademark) 5218 (manufactured by Huntsman).

When the epoxy resin composition according to the present invention contains a thermoplastic resin, it preferably accounts for 1 to 60 parts by mass relative to 100 parts by mass of the epoxy resin present in the epoxy resin composition.

(Incorporation of Particles)

The epoxy resin composition according to the present invention may also contain a coupling agent, thermosetting resin particles, electroconductive particles (such as carbon black, carbon particles, and metal-plated organic particles), and an inorganic fillers (such as silica gel and clay), to an extent not adversely affecting the present invention. The incorporation of such components can have viscosity adjustment effects such as increase in viscosity of epoxy resin compositions and reduction in resin flowability, modulus and heat resistance improvement effects for cured resin materials, and abrasion resistance improvement effects.

(Preparation Method for Epoxy Resin Compositions)

To prepare the epoxy resin composition according to the present invention, a mixture may be kneaded by using a machine such as kneader, planetary mixer, three roll mill, and twin screw extruder, or a mixture may be manually produced by using, for example, a beaker and a spatula if uniform kneading is possible.

(Bending Characteristics of Cured Epoxy Resin)

A cured resin produced by curing the epoxy resin composition according to the present invention at 130° C. for 2 hours preferably has a bending elastic modulus of 3.5 GPa or more, more preferably 3.7 GPa or more. An elastic modulus of 3.5 GPa or more enables the production of a fiber reinforced composite material having a high static strength. The upper limit of the bending elastic modulus is generally 5.0 GPa or less.

Here, the bending elastic modulus and bending deflection of a cured resin are measured as described below. In a mold containing a spacer set to a thickness of 2 mm, curing is performed at a temperature of 130° C. for 2 hours to prepare a cured resin sample with a thickness of 2 mm. A test piece having a width of 10 mm and a length of 60 mm is cut out from this cured resin sample, and three point bending test is conducted by using an Instron type universal tester (manufactured by Instron Corporation) at a span length of 32 mm and a crosshead speed of 2.5 mm/minute according to JIS K 7171 (1994) to measure the bending elastic modulus and bending deflection.

Here, there are no specific limitations on the curing temperature and curing time to be adopted to prepare a cured resin sample and they may be set appropriately by the user since optimum conditions differ depending on the shape and thickness of the intended molded article, but curing at a temperature of 130° C. to 150° C. for 90 minutes to 2 hours is preferable from the viewpoint of carrying out molding in a short time while preventing runaway reactions.

(Fiber Reinforced Composite Material)

Next, the fiber reinforced composite material is described. A fiber reinforced composite material containing a cured product of the epoxy resin composition according to the present invention as matrix resin can be produced by blending and integrating the epoxy resin composition according to the present invention with reinforcement fiber, followed by curing the blend.

There are no specific limitations on the reinforcement fiber to be used for the present invention, and useful examples include glass fiber, carbon fiber, aramid fiber, boron fiber, alumina fiber, and silicon carbide fiber. A plurality of these fibers may be used as a mixture. Of these, carbon fiber is preferred because it serves to produce lightweight, highly rigid fiber reinforced composite materials.

(Prepreg)

In producing a fiber reinforced composite material, it is preferable to first prepare prepreg composed mainly of an epoxy resin composition and reinforcement fiber. This form of material enables accurate control of prepreg fiber arrangement and resin proportions so that a composite material having best possible characteristics can be obtained. Such prepreg can be obtained by impregnating a reinforcement fiber base with the epoxy resin composition according to the present invention. Useful methods for the impregnation include hot melting (dry method) and other generally known techniques.

Hot melting may be carried out by a process in which an epoxy resin composition having a viscosity reduced by heating is used for direct impregnation of the reinforcement fiber, or a process in which an epoxy resin composition is first spread over a piece of release paper or the like to form film sheets, which are then laid on one surface or on both surfaces of a reinforcement fiber sheet, followed by applying heat and pressure to impregnate the reinforcement fiber with the resin.

In the formation of a prepreg laminate, techniques that can be used for applying heat and pressure include press molding, autoclave molding, bucking molding, wrapping tape method, or internal pressure molding.

Fiber reinforced composite materials containing a cured product of the epoxy resin composition according to the present invention and reinforcement fiber are well adapted for use in sport applications, general industrial applications, and aerospace applications. More specifically, preferred sport applications include golf shafts, fishing rods, tennis and badminton rackets, hockey and other sticks, and skiing poles. Furthermore, preferred general industrial applications include structural material of vehicles (such as automobiles, bicycles, ships, and railroad vehicles), drive shaft, plate springs, windmill blades, pressure vessels, flywheels, rollers for paper manufacture, roofing materials, cables, and mending/reinforcing materials.

EXAMPLES

The present invention is described below in more detail with reference to Examples, but it should be understood that the invention is not construed as being limited thereto.

The components used in the Examples are as described below.

<Materials Used>

Epoxy resin [A]

[A1]-1: jER (registered trademark) 154 (phenol novolac type epoxy resin having an epoxy equivalent of 178 and 3.0 functional groups on average per molecule, manufactured by Mitsubishi Chemical Corporation)

[A1]-2: Epicron (registered trademark) N-775 (phenol novolac type epoxy resin having an epoxy equivalent of 190 and 6.5 functional groups on average per molecule, manufactured by DIC)

[A1]-3: Epicron (registered trademark) HP-7200 H (dicyclopentadiene type epoxy resin having an epoxy equivalent of 279 and 3.0 functional groups on average per molecule, manufactured by DIC)

[A1]-4: jER (registered trademark) 152 (phenol novolac type epoxy resin having an epoxy equivalent of 177 and 2.2 functional groups on average per molecule, manufactured by Mitsubishi Chemical Corporation)

[A2]-1: Sumiepoxy (registered trademark) ELM434 (tetraglycidyl diaminodiphenyl methane having an epoxy equivalent of 125, manufactured by Sumitomo Chemical Co., Ltd.)

[A2]-2: Araldite (registered trademark) MY0600 (triglycidyl m-aminophenol having an epoxy equivalent of 118, manufactured by Huntsman Advanced Materials)

[A3]-1: Epicron (registered trademark) 830 (liquid bisphenol F type epoxy resin having an epoxy equivalent of 168, manufactured by DIC)

[A3]-2: Epotohto (registered trademark) YDF-2001 (solid bisphenol F type epoxy resin having an epoxy equivalent of 475, manufactured by Tohto Kasei Co., Ltd.)

[A]-1: jER (registered trademark) 828 (liquid bisphenol A type epoxy resin having an epoxy equivalent of 189, manufactured by Mitsubishi Chemical Corporation)

[A]-2: jER (registered trademark) 1001 (solid bisphenol A type epoxy resin having an epoxy equivalent of 475, manufactured by Mitsubishi Chemical Corporation)

Dicyandiamide [B]

[B]-1: DICY7 (dicyandiamide, manufactured by Mitsubishi Chemical Corporation).

Aromatic urea compound [C]

[C]-1: DCMU99 (3-(3,4-dichlorophenyl)-1,1-dimethylurea, manufactured by Hodogaya Chemical Co., Ltd.)

[C]-2: Omicure (registered trademark) 24 (2,4-toluene bis-dimethylurea), manufactured by PTI Japan)

Curing accelerator [C'] other than aromatic urea compounds

[C']-1: Curezol (registered trademark) 2PHZ-PW (2-phenyl-4,5-dihydroxymethyl imidazole, manufactured by Shikoku Chemicals Corporation)

[C']-2: Curezol (registered trademark) 2P4MHZ-PW (2-phenyl-4-methyl-5-hydroxymethyl imidazole, manufactured by Shikoku Chemicals Corporation)

[C']-3: Cureduct (registered trademark) P-0505 (epoxy-imidazole adduct, manufactured by Shikoku Chemicals Corporation)

A mixture containing a boric ester [D]

[D]-1 Cureduct (registered trademark) L-07N (a composition containing 5 parts by mass of a boric ester compound, manufactured by Shikoku Chemicals Corporation)

Thermoplastic resin [E]

[E]-1: Vinylec (registered trademark) K (polyvinyl formal, manufactured by JNC Corporation).

Other compounds

Bisphenol S (bis(hydroxyphenyl)sulfone, manufactured by Tokyo Chemical Industry Co., Ltd., crushed in a hammer mill and sieve-classified, average particle diameter of 14.8 µm)

<Preparation Method for Epoxy Resin Compositions>

(1) Method for producing curing accelerator master batch and curing agent master batch A mixture containing the aromatic urea compound [C] or the curing accelerator [C'] and the boric ester [D] was added to 10 parts by mass (10 parts by mass relative to 100 parts by mass of the epoxy resin [A]) of [A3]-1 (Epicron (registered trademark) 830) or [A]-1 (jER (registered trademark) 828), which are liquid resins, followed by kneading by a kneader at room temperature. A three roll mill was set and the mixture was passed twice between the rolls to prepare a curing accelerator master batch. The dicyandiamide [B] and bisphenol S, where bisphenol S is needed, were added to the curing accelerator master batch, kneaded using a kneader at room temperature, and passed twice between the rolls of a three roll mill to prepare a curing agent master batch.

(2) Production Method for Epoxy Resin Compositions

First, 90 parts by mass of the epoxy resin [A], which in this case means the epoxy resin [A] excluding the 10 parts by mass of the [A3]-1 (Epicron (registered trademark) 830) or [A]-1 (jER (registered trademark) 828) that was used in paragraph (1) above, and the thermoplastic resin [E] were put in a kneader and kneaded while raising the temperature to 150° C., followed by continuing the kneading at 150° C. for 1 hour to obtain a transparent viscous liquid. After cooling the viscous liquid to 60° C. while kneading, the curing agent master batch prepared in paragraph (1) above was added, followed by kneading at 60° C. for 30 minutes to prepare an epoxy resin composition.

The components and their proportions used in Examples and Comparative examples are shown in Tables 1 and 5.

<Evaluation Methods for Characteristics of Resin Compositions>

(1) T(100)

First, 3 mg of an epoxy resin composition was weighed, put on a sample pan, and heated from 30° C. to 100° C. at a rate of 100° C./minute using a differential scanning calorimeter (Q-2000, manufactured by TA Instrument), followed by isothermal measurement for 8 hours. The time point 42 seconds after the start of heating was defined as the isothermal measurement start point. The time period after the isothermal measurement start point until the exothermic peak top in the heat flow curve was measured, and the measurement was adopted as the time period for reaching the peak top in isothermal measurement at 100° C. Three samples were examined at each test level and the average of the measurements was adopted. Hereinafter, the average obtained in this measurement is referred as T(100) (which is represented in minutes).

(2) T(60)

First, 3 mg of an epoxy resin composition was weighed, put on a sample pan, and heated from 30° C. to 60° C. at a rate of 100° C./minute using a differential scanning calorimeter (Q-2000, manufactured by TA Instrument), followed by isothermal measurement for 48 hours. The time point 18 seconds after the start of heating was defined as the isothermal measurement start point. The time period after the isothermal measurement start point until the exothermic peak top in the heat flow curve was measured, and the measurement was adopted as the time period for reaching the peak top in isothermal measurement at 60° C. Three samples were examined at each test level and the average of the measurements was adopted. Hereinafter, the average obtained in this measurement is referred as T(60) (which is represented in minutes). It should be noted that the value of the T(60) was shown as "48 or more" when a peak top did not appear within 48 hours.

<Production and Evaluation Methods for Cured Resin>

(1) Elastic Modulus and Deflection of Cured Resin

An epoxy resin composition was defoamed in vacuum and cured at a temperature of 130° C. for 90 minutes in a mold having a 2 mm thick spacer of Teflon (registered trademark) set to produce a product with a thickness of 2 mm, thus providing cured resin plates with a thickness of 2 mm. A test piece having a width of 10 mm and a length of 60 mm was cut out from this cured resin plate, and three point bending was conducted by using an Instron type universal tester (manufactured by Instron Corporation) at a span of 32 mm and a crosshead speed of 100 mm/minute according to JIS K7171 (1994) to measure the elastic modulus and deflection. Five samples (n=5) were examined and the averages of the measurements taken were adopted to represent the elastic modulus and deflection.

<Production and Evaluation Methods for Prepreg>

(1) Method for Producing Prepreg

An epoxy resin composition prepared as specified in <Production method for epoxy resin compositions> was spread on a piece of release paper using a film coater to produce a resin film having a Metsuke (=a weight of resin/unit area) of 74 g/m$^2$.

This resin film was placed in a prepreg producing apparatus, and a sheet of Torayca carbon fiber (registered trademark) T700S (manufactured by Toray Industries, Inc., Metsuke (=a weight of resin/unit area) 150 g/m$^2$), in which fibers were paralleled in one direction, was impregnated from both surfaces by applying heat and pressure to provide prepreg with a resin content of 33 mass %.

(2) Evaluation Method for Curing Speed of Prepreg

The curing speed of prepreg was evaluated by cutting out a 20 cm×20 cm square test piece from the prepreg, sandwiching the test piece between Teflon (registered trademark) sheets having a thickness of 150 μm, pressing the stack at 130° C., and evaluating the handleability as it was taken out. The handleability was evaluated according to the following criteria, and specimens rated as A to C were judged as acceptable.

A: the prepreg was not deformed when it was taken out after 20 minutes,

B: the prepreg was deformed when it was taken out after 20 minutes, but it was not deformed when it was taken out after 30 minutes, C: the prepreg was deformed when it was taken out after 30 minutes, but it was not deformed when it was taken out after 40 minutes, and C: the curing speed was insufficient, and the prepreg was deformed when it was taken out after 40 minutes.

(3) Evaluation Method for Storage Stability of Prepreg

The storage stability of prepreg was evaluated by cutting out a 10 cm square test piece from the prepreg, leaving it at 40° C. for 60 days, and measuring the increase in the glass transition temperature. The glass transition temperature was measured by weighing and placing 8 mg of stored prepreg on a sample pan, taking measurements using a differential scanning calorimeter (Q-2000: manufactured by TA Instrument) and increasing the temperature from −50° C. to 50° C. at a rate of 10° C./minute. The middle point between the flexion points in the exothermic curve obtained was adopted as Tg.

(4) Evaluation Method for Storage Stability of Prepreg Heat-Treated at 80° C. for 1 Hour The storage stability of prepreg heat-treated at 80° C. for 1 hour was evaluated to represent its storage stability after undergoing heat history. A 10 cm×10 cm square test piece was cut out from prepreg, left for 1 hour on the surface of a pressing machine adjusted at 80° C., and quenched on an aluminum plate maintained at room temperature to prepare a prepreg sample undergoing heat history. The sample obtained was subjected to storage stability evaluation in terms of the rise in the glass transition temperature occurring in the sample which was measured after leaving the sample at 40° C. for 60 days according to the same procedure as in paragraph (3).

s<Evaluation Method for Characteristics of Carbon Fiber Reinforced Plastic (CFRP) Material>

(1) Preparation Method for Unidirectional CFRP Laminates

A unidirectional laminate to be used for the evaluation of characteristics of CFRP was produced by the procedure described below. First, 13 plies of the unidirectional prepreg prepared by the <Method for producing prepreg> described above were stacked with their fibers aligned in one direction. The prepreg laminate was tightly covered with nylon films and cured by applying heat and pressure for 2 hours in an autoclave having a temperature of 130° C. and an internal pressure of 0.3 MPa to produce a unidirectional laminate.

(2) Evaluation Method for 0° Bending Strength of CFRP

A test piece having a thickness of 2 mm, a width of 15 mm, and a length of 100 mm was cut out from a unidirectional laminate produced as described above. Three point bending test was conducted according to JIS K7074 (1988) by using an Instron type universal tester (manufactured by Instron Corporation). Measurement were taken under the conditions of a span of 80 mm, a crosshead speed of 5.0 mm/minute, an indenter diameter of 10 mm, and a span diameter of 4.0 mm to determine the 0° bending strength. Measurements were taken from 6 specimens (n=6) and their average was adopted to represent the 0° bending strength.

(3) Evaluation Method for 90° Bending Strength of CFRP

A test piece having a thickness of 2 mm, a width of 15 mm, and a length of 60 mm was cut out from a unidirectional laminate produced as described above. Three point bending test was conducted according to JIS K7074 (1988) by using an Instron type universal tester (manufactured by Instron Corporation). Measurements were taken under the conditions of a span of 40 mm, a crosshead speed of 1.0 mm/minute, an indenter diameter of 10 mm, and a span diameter of 4.0 mm to determine the 90° bending strength. Measurements were taken from 6 specimens (n=6) and their average was adopted to represent the 90° bending strength.

Example 1

Using 30 parts by mass of jER (registered trademark) 154, 40 parts by mass of jER (registered trademark) 828, and 30 parts by mass of jER (registered trademark) 100 as the epoxy resin component [A], together with 5.3 parts by mass of DICY7 as the dicyandiamide component [B], 3.0 parts by mass of DCMU99 as the aromatic urea compound component [C], 3.0 parts by mass of Cureduct (registered trademark) L-07N as a mixture containing the boric ester component [D], and 3.0 parts by mass of Vinylec (registered trademark) K as thermoplastic resin, an epoxy resin composition was prepared according to the <Production method for epoxy resin compositions> described above. More specifically, 3.0 parts by mass of DCMU99 and 3.0 parts by mass of Cureduct (registered trademark) L-07N were added to 10 parts by mass of [A]-1 (jER (registered trademark) 828), which is a liquid (10 parts by mass of the 100 parts by mass of the epoxy resin component [A]), and kneaded at room temperature using a kneader. A three roll mill was set and the mixture was passed twice between the rolls to prepare a curing accelerator master batch. First, 5.3 parts by mass of DICY7 was added to the curing accelerator master batch, kneaded by a kneader at room temperature, and passed twice between the rolls of a three roll mill to prepare a curing agent master batch.

In the kneader, 30 parts by mass of jER (registered trademark) 154, 30 parts by mass of jER (registered trademark) 828, and 30 parts by mass of jER (registered trademark) 1001 were fed as the remaining 90 parts by mass of the epoxy resin component [A], followed by adding 3.0 parts by mass of Vinylec (registered trademark) K. While kneading, the temperature was raised to 150° C., and kneading was continued at 150° C. for 1 hour to provide a transparent viscous liquid. After cooling the viscous liquid to 60° C. while kneading, the curing agent master batch prepared above was added, followed by kneading at 60° C. for 30 minutes to prepare an epoxy resin composition.

This epoxy resin composition was subjected to T(100) and T(60) measurement and found to have a T(100) of 43 minutes and a T(60) of 29 hours.

The epoxy resin composition was cured by the procedure described in the paragraph <Production and evaluation methods for cured resin> described above to prepare a cured resin material, which was then subjected to three point bending test described in the same paragraph and found to have an elastic modulus of 3.3 GPa and a deflection of 10.2 mm, showing that the cured resin material had good mechanical characteristics.

In addition, prepreg was produced from the epoxy resin composition obtained above, by the procedure described in <Production and evaluation methods for prepreg>. The resulting prepreg was found to have a sufficiently high tackiness and drapability. When the resulting prepreg was evaluated for the curing speed and storage stability by the procedure described in the same paragraph, the prepreg cured at 130° C. hardened in 30 minutes to a degree where it would deform no more, while the prepreg underwent only a small rise of 2° C. in Tg after storage at 40° C. for 60 days, indicating that the prepreg had a sufficiently high curing speed and storage stability. To examine the stability against heat history, the prepreg was heat-treated at 80° C. for 1 hour and subjected to evaluation for storage stability, and results showed that the rise in Tg was only 3° C. after storage at 40° C. for 60 days, indicating the same level of storage stability as before the heat treatment at 80° C.

Prepreg was laminated and cured by the procedure described in paragraph <Evaluation method for characteristics of carbon fiber reinforced plastic (CFRP) material> to produce a unidirectional laminate, which was then subjected to three point bending test and found to have a 0° bending strength of 1,420 MPa and a 90° bending strength of 105 MPa, demonstrating that the CFRP had good mechanical characteristics.

Examples 2 to 16

Except for using the resin components that are shown in Tables 1 to 3, epoxy resin compositions, cured resin materials, and prepreg samples were prepared by carrying out the same procedure as in Example 1. All the resulting prepreg samples exhibited a sufficiently high tackiness and drapability as in the case of Example 1.

The epoxy resin compositions obtained in these Examples gave T (100) and T (60) values as shown in Tables 1 to 3.

The prepreg samples were subjected to evaluation for the curing speed, storage stability and stability against heat history as in Example 1 and they were found to show a sufficiently high curing speed, storage stability and stability against heat history at all test levels.

All cured resin materials obtained exhibited favorable elastic modulus and deflection values, and the CFRP products obtained also exhibited good mechanical characteristics.

Comparative Example 1

Epoxy resin compositions, prepreg samples, and cured resin materials were prepared by the same procedure as in Example 1 using the resin components given in Table 4. Characteristics of the resin composition and its evaluation results are shown in Table 4. The epoxy resin composition gave a T (60) of 23 hours, that is, a value less than 25 hours, indicating that the prepreg failed to show a sufficiently high storage stability. The prepreg was heat-treated at 80° C. for 1 hour and subjected to evaluation for storage stability, and results showed that Tg largely rose to 44° C. probably because of the presence of bisphenol S, indicating insufficient stability against heat history.

Comparative Example 2

Epoxy resin compositions, prepreg samples, and cured resin materials were prepared by the same procedure as in Example 1 using the resin components given in Table 4. The composition is the same as in Comparative example 1 except for the absence of bisphenol S. Characteristics of the resin composition and its evaluation results are shown in Table 4. The prepreg sample exhibited high storage stability and gave a cured material with good characteristics including sufficient stability against heat history, but the epoxy resin composition gave a T(100) of 70 minutes, that is, a value longer than 60 minutes, indicating that the resulting prepreg failed to show a sufficiently high curing speed.

Comparative Example 3

Except that component [D] was not added, an epoxy resin composition, prepreg, and cured resin material were prepared by carrying out the same procedure as in Example 4. Characteristics of the resin composition and its evaluation results are shown in Table 4. The epoxy resin composition gave a T (60) of 19 hours, that is, a value less than 25 hours, indicating that the prepreg failed to show a sufficiently high storage stability. The prepreg was heat-treated at 80° C. for 1 hour and subjected to evaluation for storage stability, and results showed that Tg largely rose to 43° C., indicating insufficient stability against heat history.

Comparative Example 4

Except for using Curezol (registered trademark) 2PHZ-PW (1.0 part by mass) as curing accelerator and not adding compound [D], the same procedure as in Example 2 was carried out to produce an epoxy resin composition, prepreg, and cured resin material. Characteristics of the resin composition and its evaluation results are shown in Table 4. The prepreg sample exhibited high storage stability and gave a cured material with good characteristics including sufficient stability against heat history, but the epoxy resin composition gave a T(100) of 300 minutes, that is, a value considerably longer than 60 minutes, indicating that the resulting prepreg failed to show a sufficiently high curing speed.

Comparative Example 5

Except for using Curezol (registered trademark) 2P4MHZ-PW (1.0 part by mass) as curing accelerator and not adding compound [D], the same procedure as in Example 2 was carried out to produce an epoxy resin composition, prepreg, and cured resin material. Characteristics of the resin composition and its evaluation results are shown in Table 4. The epoxy resin composition gave a T (60) of 24 hours, that is, a value less than 25 hours, indicating that the prepreg failed to show a sufficiently high storage stability. The prepreg was heat-treated at 80° C. for 1 hour and subjected to evaluation for storage stability, and results showed that Tg largely rose to 44° C., indicating insufficient stability against heat history.

Comparative Example 6

Except for using resin components as shown in Table 5, the same procedure as in Example 1 was carried out to produce an epoxy resin composition, prepreg, and cured resin material. Characteristics of the resin composition and its evaluation results are shown in Table 5. The epoxy resin composition gave a T (60) of 15 hours, that is, a value less than 25 hours, indicating that the prepreg failed to show a sufficiently high storage stability. The prepreg was heat-treated at 80° C. for 1 hour and subjected to evaluation for storage stability, and results showed that Tg largely rose to 42° C., indicating insufficient stability against heat history.

The resulting cured resin had a deteriorated balance between elastic modulus and deflection, leading to CFRP having a poor 90° bending strength of 83 MPa.

Comparative Example 7

Except for using resin components as shown in Table 5, the same procedure as in Example 1 was carried out to produce an epoxy resin composition, prepreg, and cured resin material. Characteristics of the resin composition and its evaluation results are shown in Table 5. The prepreg sample exhibited high storage stability and gave a cured material with good characteristics including sufficient stability against heat history, but the epoxy resin composition gave a T(100) of 70 minutes, that is, a value considerably longer than 60 minutes, indicating that the resulting prepreg failed to show a sufficiently high curing speed.

Comparative Example 8

Except for using resin components as shown in Table 5, the same procedure as in Example 1 was carried out to produce an epoxy resin composition, prepreg, and cured resin material. Characteristics of the resin composition and its evaluation results are shown in Table 5. The epoxy resin composition gave a T (60) of 24 hours, that is, a value less than 25 hours, indicating that the prepreg failed to show a sufficiently high storage stability.

Comparative Example 9

Except for using resin components as shown in Table 5, the same procedure as in Example 1 was carried out to produce an epoxy resin composition, prepreg, and cured resin material. Characteristics of the resin composition and its evaluation results are shown in Table 5. The prepreg sample exhibited high storage stability and gave a cured material with good characteristics including sufficient stability against heat history, but the epoxy resin composition gave a T(100) of 65 minutes, that is, a value considerably longer than 60 minutes, indicating that the resulting prepreg failed to show a sufficiently high curing speed.

Comparative Example 10

Except for using resin components as shown in Table 5, the same procedure as in Example 1 was carried out to produce an epoxy resin composition, prepreg, and cured resin material. Characteristics of the resin composition and its evaluation results are shown in Table 5. The epoxy resin composition gave a T (60) of 22 hours, that is, a value less than 25 hours, indicating that the prepreg failed to show a sufficiently high storage stability.

Comparative Example 11

Except for using resin components as shown in Table 5, the same procedure as in Example 1 was carried out to produce an epoxy resin composition, prepreg, and cured resin material. Characteristics of the resin composition and its evaluation results are shown in Table 5. The epoxy resin composition gave a T (60) of 13 hours, that is, a value less than 25 hours, indicating that the prepreg failed to show a sufficiently high storage stability. The prepreg was heat-treated at 80° C. for 1 hour and subjected to evaluation for storage stability, and results showed that Tg largely rose to 43° C., indicating insufficient stability against heat history. The resulting cured resin had a deteriorated balance between elastic modulus and defection, leading to CFRP having a poor 90° bending strength of 73 MPa.

TABLE 1

| Resin composition | | | | | Example 1 | Example 2 | Example 3 | Example 4 |
|---|---|---|---|---|---|---|---|---|
| | epoxy resin | [A1] | [A1]-1: jER® 154 | | 30 | 30 | | |
| | | | [A1]-2: Epicron® N-775 | | | | 30 | |
| | | | [A1]-3: Epicron® HP-7200 H | | | | | 30 |
| | | | [A1]-4: jER® 152 | | | | | |
| | | [A2] | [A2]-1: Sumiepoxy® ELM-434 | | | | | |
| | | | [A2]-2: Araldite® MY0600 | | | | | |
| | | [A3] | [A3]-1: Epicron® 830 | | | 40 | 40 | 40 |
| | | other | [A]-1: jER® 828 | | 40 | | | |
| | | | [A]-2: jER® 1001 | | 30 | 30 | 30 | 30 |
| | curing agent | | [B]-1: DICY7 | | 5.3 | 5.6 | 5.5 | 4.9 |
| | curing accelerator | | [C]-1: DCMU | | 3.0 | 3.0 | 3.0 | 3.0 |
| | mixture containing boric ester | | [D]-1: Cureduct® L-07N | | 3.0 | 3.0 | 3.0 | 3.0 |
| | thermoplastic resin | | [E]-1: Vinylec® K | | 3.0 | 3.0 | 2.0 | 2.0 |
| Measurements | resin composition characteristics | | [a]: T(100) [min] | | 43 | 42 | 43 | 44 |
| | | | [b]: T(60) [hrs] | | 29 | 28 | 28 | 29 |
| | | | [c]: average epoxy equivalent over all epoxy resins [g/eq] | | 226 | 213 | 218 | 245 |
| | | | presence of tri- or higher functional epoxy resin Y: yes, N: no | | Y | Y | Y | Y |
| | | | [d]: content [parts by mass] of [A1] in total epoxy resin (100 parts by mass) | | 30 | 30 | 30 | 30 |
| | | | average number of functional groups per molecule of [A1] | | 3.0 | 3.0 | 6.5 | 3.0 |
| | | | [e]: content [parts by mass] of [A2] in total epoxy resin (100 parts by mass) | | 0 | 0 | 0 | 0 |
| | | | content [parts by mass] of [A3] in total epoxy resin (100 parts by mass) | | 0 | 40 | 40 | 40 |
| | | | (i) meets requirements [a] and [b]? Y: yes, N: no | | Y | Y | Y | Y |
| | | | (ii) meets requirements [c] and [d]? Y: yes, N: no | | Y | Y | Y | Y |
| | | | (iii) meets requirements [c] and [e]? Y: yes, N: no | | N | N | N | N |

TABLE 1-continued

|  |  |  | | | | |
|---|---|---|---|---|---|---|
| prepreg characteristics | curability (pressed, heated at 130° C.) A: 20 min or less, B: 30 min or less, C: 40 min or less, D: more than 40 min | | B | B | B | B |
|  | storage stability (Tg rise after 60 day storage at 40° C. [° C.]) | | 2 | 2 | 2 | 2 |
|  | storage stability after 1 hour heat treatment at 80° C. (Tg rise after 60 day storage at 40° C. [° C.]) | | 3 | 2 | 3 | 2 |
| cured material characteristics | elastic modulus of cured material [GPa] | | 3.3 | 3.7 | 3.7 | 3.6 |
|  | deflection of cured material [mm] | | 10.2 | 8.6 | 8.3 | 8.4 |
| CFRP characteristics | 0° bending strength [MPa] | | 1420 | 1565 | 1568 | 1522 |
|  | 90° bending strength [MPa] | | 105 | 118 | 117 | 114 |

|  |  |  | Example 5 | Example 6 | Example 7 |
|---|---|---|---|---|---|
| Resin composition | epoxy resin [A1] | [A1]-1: jER ® 154 | | | |
|  |  | [A1]-2: Epicron ® N-775 | | | |
|  |  | [A1]-3: Epicron ® HP-7200 H | | | |
|  |  | [A1]-4: jER ® 152 | 30 | | |
|  | [A2] | [A2]-1: Sumiepoxy ® ELM-434 | | 30 | |
|  |  | [A2]-2: Araldite ® MY0600 | | | 30 |
|  | [A3] | [A3]-1: Epicron ® 830 | 40 | 40 | 40 |
|  | other | [A]-1: jER ® 828 | | | |
|  |  | [A]-2: jER ® 1001 | 30 | 30 | 30 |
|  | curing agent | [B]-1: DICY7 | 5.7 | 6.5 | 6.7 |
|  | curing accelerator | [C]-1: DCMU | 3.0 | 3.0 | 3.0 |
|  | mixture containing boric ester | [D]-1: Cureduct ® L-07N | 3.0 | 3.0 | 3.0 |
|  | thermoplastic resin | [E]-1: Vinylec ® K | 2.0 | 3.0 | 3.5 |
| Measurements | resin composition characteristics | [a]: T(100) [min] | 55 | 43 | 39 |
|  |  | [b]: T(60) [hrs] | 27 | 28 | 27 |
|  |  | [c]: average epoxy equivalent over all epoxy resins [g/eq] | 212 | 185 | 180 |
|  |  | presence of tri- or higher functional epoxy resin Y: yes, N: no | Y | Y | Y |
|  |  | [d]: content [parts by mass] of [A1] in total epoxy resin (100 parts by mass) | 30 | 0 | 0 |
|  |  | average number of functional groups per molecule of [A1] | 2.2 | — | — |
|  |  | [e]: content [parts by mass] of [A2] in total epoxy resin (100 parts by mass) | 0 | 30 | 30 |
|  |  | content [parts by mass] of [A3] in total epoxy resin (100 parts by mass) | 40 | 40 | 40 |
|  |  | (i) meets requirements [a] and [b]? Y: yes, N: no | Y | Y | Y |
|  |  | (ii) meets requirements [c] and [d]? Y: yes, N: no | Y | N | N |
|  |  | (iii) meets requirements [c] and [e]? Y: yes, N: no | N | Y | Y |
|  | prepreg characteristics | curability (pressed, heated at 130° C.) A: 20 min or less, B: 30 min or less, C: 40 min or less, D: more than 40 min | C | B | B |
|  |  | storage stability (Tg rise after 60 day storage at 40° C. [° C.]) | 3 | 2 | 3 |
|  |  | storage stability after 1 hour heat treatment at 80° C. (Tg rise after 60 day storage at 40° C. [° C.]) | 4 | 3 | 3 |
|  | cured material characteristics | elastic modulus of cured material [GPa] | 3.6 | 3.8 | 4.0 |
|  |  | deflection of cured material [mm] | 7.2 | 7.3 | 6.5 |
|  | CFRP characteristics | 0° bending strength [MPa] | 1515 | 1604 | 1652 |
|  |  | 90° bending strength [MPa] | 111 | 115 | 108 |

TABLE 2

|  |  |  | Example 8 | Example 9 | Example 10 | Example 11 |
|---|---|---|---|---|---|---|
| | epoxy resin [A1] | [A1]-3: Epicron ® HP-7200 H | 15 | 45 | | |
| | [A2] | [A2]-1: Sumiepoxy ® ELM-434 | | | 15 | 45 |
| | [A3] | [A3]-1: Epicron ® 830 | 60 | 30 | 60 | 30 |
| |  | [A3]-2: Epotohto ® YDF-2001 | 25 | 25 | 25 | 25 |
| | curing agent | [B]-1: DICY7 | 5.6 | 4.7 | 6.3 | 7.1 |
| | curing accelerator | [C]-1: DCMU | 3.0 | 3.0 | 3.0 | 3.0 |
| | mixture containing boric ester | [D]-1: Cureduct ® L-07N | 3.0 | 3.0 | 3.0 | 3.0 |
| | thermoplastic resin | [E]-1: Vinylec ® K | 3.0 | 1.5 | 4.0 | 3.0 |
| Measurements | resin composition characteristics | [a]: T(100) [min] | 58 | 39 | 55 | 36 |
| |  | [b]: T(60) [hrs] | 32 | 28 | 31 | 26 |
| |  | average epoxy equivalent over all epoxy resins [g/eq] | 216 | 255 | 189 | 169 |
| |  | presence of tri- or higher functional epoxy resin Y: yes, N: no | Y | Y | Y | Y |
| |  | content [parts by mass] of [A1] in total epoxy resin (100 parts by mass) | 15 | 45 | 0 | 0 |
| |  | average number of functional groups per molecule of [A1] | 3.0 | 3.0 | — | — |

TABLE 2-continued

| | | Example 8 | Example 9 | Example 10 | Example 11 |
|---|---|---|---|---|---|
| | content [parts by mass] of [A2] in total epoxy resin (100 parts by mass) | 0 | 0 | 15 | 45 |
| | content [parts by mass] of [A3] in total epoxy resin (100 parts by mass) | 85 | 55 | 85 | 55 |
| | (i) meets requirements [a] and [b]? Y: yes, N: no | Y | Y | Y | Y |
| | (ii) meets requirements [c] and [d]? Y: yes, N: no | Y | Y | N | N |
| | (iii) meets requirements [c] and [e]? Y: yes, N: no | N | N | Y | Y |
| prepreg characteristics | curability (pressed, heated at 130° C.) A: 20 min or less, B: 30 min or less, C: 40 min or less, D: more than 40 min | C | B | C | B |
| | storage stability (Tg rise after 60 day storage at 40° C. [° C.]) | 1 | 2 | 1 | 4 |
| | storage stability after 1 hour heat treatment at 80° C. (Tg rise after 60 day storage at 40° C. [° C.]) | 2 | 3 | 1 | 4 |
| cured material characteristics | elastic modulus of cured material [GPa] | 3.8 | 3.7 | 3.7 | 3.9 |
| | deflection of cured material [mm] | 7.1 | 7.9 | 7.5 | 7.0 |
| CFRP characteristics | 0° bending strength [MPa] | 1611 | 1558 | 1562 | 1625 |
| | 90° bending strength [MPa] | 110 | 115 | 113 | 119 |

TABLE 3

| | | | Example 12 | Example 13 | Example 14 | Example 15 | Example 16 |
|---|---|---|---|---|---|---|---|
| | epoxy resin [A1] | [A1]-3: Epicron ® HP-7200 H | 30 | 30 | 30 | 30 | 20 |
| | [A2] | [A2]-1: Sumiepoxy ® ELM-434 | | | | | 20 |
| | [A3] | [A3]-1: Epicron ® 830 | 45 | 45 | 40 | 20 | 30 |
| | | [A3]-2: Epotohto ® YDF-2001 | 25 | 25 | | | |
| | other | [A]-1: jER ® 828 | | | | 20 | |
| | | [A]-2: jER ® 1001 | | | 30 | 30 | 30 |
| | curing agent | [B]-1: DICY7 | 5.1 | 5.1 | 4.9 | 4.7 | 5.7 |
| | curing accelerator | [C]-1: DCMU | | | 3.0 | 3.0 | 3.0 |
| | | [C]-2: Omicure ® 24 | 3.0 | 3.0 | | | |
| | mixture containing boric ester | [D]-1: Cureduct ® L-07N | 3.0 | 5.0 | 1.5 | 3.0 | 3.0 |
| | thermoplastic resin | [E]-1: Vinylec ® K | 2.5 | 2.5 | 2.0 | 2.0 | 2.0 |
| Measurements | resin composition characteristics | [a]: T(100) [min] | 25 | 26 | 43 | 43 | 38 |
| | | [b]: T(60) [hrs] | 27 | 30 | 26 | 28 | 29 |
| | | average epoxy equivalent over all epoxy resins [g/eq] | 234 | 234 | 245 | 253 | 211 |
| | | presence of tri- or higher functional epoxy resin Y: yes, N: no | Y | Y | Y | Y | Y |
| | | content [parts by mass] of [A1] in total epoxy resin (100 parts by mass) | 30 | 30 | 30 | 30 | 20 |
| | | average number of functional groups per molecule of [A1] | 3.0 | 3.0 | 3.0 | 3.0 | 3.0 |
| | | content [parts by mass] of [A2] in total epoxy resin (100 parts by mass) | 0 | 0 | 0 | 0 | 20 |
| | | content [parts by mass] of [A3] in total epoxy resin (100 parts by mass) | 70 | 70 | 40 | 20 | 30 |
| | | (i) meets requirements [a] and [b] Y: yes, N: no | Y | Y | Y | Y | Y |
| | | (ii) meets requirements [c] and [d]? Y: yes, N: no | Y | Y | Y | Y | Y |
| | | (iii) meets requirements [c] and [e]? Y: yes, N: no | N | N | N | N | Y |
| | prepreg characteristics | curability (pressed, heated at 130° C.) A: 20 min or less, B: 30 min or less, C: 40 min or less, D: more than 40 min | A | A | B | B | B |
| | | storage stability (Tg rise after 60 day storage at 40° C. [° C.]) | 3 | 1 | 3 | 2 | 1 |
| | | storage stability after 1 hour heat treatment at 80° C. (Tg rise after 60 day storage at 40° C. [° C.]) | 4 | 2 | 3 | 3 | 2 |
| | cured material characteristics | elastic modulus of cured material [GPa] | 3.8 | 3.8 | 3.6 | 3.5 | 3.8 |
| | | deflection of cured material [mm] | 7.6 | 7.4 | 6.6 | 9.4 | 7.6 |
| | CFRP characteristics | 0° bending strength [MPa] | 1587 | 1594 | 1520 | 1489 | 1604 |
| | | 90° bending strength [MPa] | 115 | 113 | 110 | 114 | 118 |

TABLE 4

| | | | Comparative example 1 | Comparative example 2 | Comparative example 3 | Comparative example 4 | Comparative example 5 |
|---|---|---|---|---|---|---|---|
| Resin composition | epoxy resin [A1] | [A1]-1: jER ® 154 | | | | 30 | 30 |
| | | [A1]-3: Epicron ® HP-7200 H | | | 30 | | |

TABLE 4-continued

| | | | Comparative example 1 | Comparative example 2 | Comparative example 3 | Comparative example 4 | Comparative example 5 |
|---|---|---|---|---|---|---|---|
| | [A3] | [A3]-1: Epicron ® 830 | | | 40 | 40 | 40 |
| | other | [A]-1: jER ® 828 | 50 | 50 | | | |
| | | [A]-2: jER ® 1001 | 50 | 50 | 30 | 30 | 30 |
| | curing agent | [B]-1: DICY7 | 4.4 | 4.4 | 4.9 | 5.6 | 5.6 |
| | curing accelerator | [C]-1: DCMU | 3.0 | 3.0 | 3.0 | | |
| | | [C']-1: Curezol ® 2PHZ-PW | | | | 1.0 | |
| | | [C']-2: Curezol ® 2P4MHZ-PW | | | | | 1.0 |
| | mixture containing boric ester | [D]-1: Cureduct ® L-07N | 3.0 | 3.0 | | | |
| | thermoplastic resin | [E]-1: Vinylec ® K | 7.0 | 7.0 | 2.0 | 3.0 | 3.0 |
| | other | bisphenol S | | 8.4 | | | |
| Measurements | resin composition characteristics | [a]: T(100) [min] | 55 | 70 | 38 | 300 | 58 |
| | | [b]: T(60) [hrs] | 23 | 35 | 19 | >48 | 24 |
| | | average epoxy equivalent over all epoxy resins [g/eq] | 270 | 270 | 245 | 213 | 213 |
| | | presence of tri- or higher functional epoxy resin Y: yes, N: no | N | N | Y | Y | Y |
| | | content [parts by mass] of [A1] in total epoxy resin (100 parts by mass) | 0 | 0 | 30 | 30 | 30 |
| | | average number of functional groups per molecule of [A1] | — | — | 3.0 | 3.0 | 3.0 |
| | | content [parts by mass] of [A2] in total epoxy resin (100 parts by mass) | 0 | 0 | 0 | 0 | 0 |
| | | content [parts by mass] of [A3] in total epoxy resin (100 parts by mass) | 0 | 0 | 40 | 40 | 40 |
| | | (i) meets requirements [a] and [b]? Y: yes, N: no | N | N | N | N | N |
| | | (ii) meets requirements [c] and [d]? Y: yes, N: no | N | N | Y | Y | Y |
| | | (iii) meets requirements [c] and [e]? Y: yes, N: no | N | N | N | N | N |
| | prepreg characteristics | curability (pressed, heated at 130° C.) A: 20 min or less, B: 30 min or less, C: 40 min or less, D: more than 40 min | C | D | B | D | C |
| | | storage stability (Tg rise after 60 day storage at 40° C. [° C.]) | 5 | 2 | 12 | 3 | 5 |
| | | storage stability after 1 hour heat treatment at 80° C. (Tg rise after 60 day storage at 40° C. [° C.]) | 44 | 3 | 43 | 5 | 44 |
| | cured material characteristics | elastic modulus of cured material [GPa] | 3.4 | 3.2 | 3.6 | 3.6 | 3.7 |
| | | deflection of cured material [mm] | 10.5 | 11.3 | 8.7 | 5.6 | 5.2 |
| | CFRP characteristics | 0° bending strength [MPa] | 1458 | 1390 | 1518 | 1525 | 1561 |
| | | 90° bending strength [MPa] | 108 | 100 | 121 | 98 | 88 |

TABLE 5

| | | | Comparative example 6 | Comparative example 7 | Comparative example 8 |
|---|---|---|---|---|---|
| | epoxy resin | [A1]-3: Epicron ® HP-7200 H | 30 | 5 | 55 |
| | [A1] | [A2]-1: Sumiepoxy ® ELM-434 | | | |
| | [A2] | | | | |
| | [A3] | [A3]-1: Epicron ® 830 | | 70 | 20 |
| | | [A3]-2: Epotohto ® YDF-2001 | | 25 | 25 |
| | other | [A]-1: jER ® 828 | 40 | | |
| | | [A]-2: jER ® 1001 | 30 | | |
| | curing agent | [B]-1: DICY7 | 4.6 | 5.9 | 4.4 |
| | curing accelerator | [C]-1: DCMU | | 3.0 | 3.0 |
| | | [C']-3: Cureduct ® P-0505 | 4.5 | | |
| | mixture containing boric ester | [D]-1: Cureduct ® L-07N | 3.0 | 3.0 | 3.0 |
| | thermoplastic resin | [E]-1: Vinylec ® K | 2.0 | 4.5 | 1.0 |
| Measurements | resin composition characteristics | [a]: T(100) [min] | 18 | 70 | 35 |
| | | [b]: T(60) [hrs] | 15 | 35 | 24 |
| | | average epoxy equivalent over all epoxy resins [g/eq] | 262 | 205 | 271 |
| | | presence of tri- or higher functional epoxy resin Y: yes, N: no | Y | Y | Y |
| | | content [parts by mass] of [A1] in total epoxy resin (100 parts by mass) | 30 | 5 | 55 |
| | | average number of functional groups per molecule of [A1] | 3.0 | 3.0 | 3.0 |
| | | content [parts by mass] of [A2] in total epoxy resin (100 parts by mass) | 0 | 0 | 0 |
| | | content [parts by mass] of [A3] in total epoxy resin (100 parts by mass) | 0 | 95 | 45 |
| | | (i) meets requirements [a] and [b]? Y: yes, N: no | N | N | N |
| | | (ii) meets requirements [c] and [d]? Y: yes, N: no | Y | N | N |
| | | (iii) meets requirements [c] and [e]? Y: yes, N: no | N | N | N |

TABLE 5-continued

| | | | | | |
|---|---|---|---|---|---|
| prepreg characteristics | curability (pressed, heated at 130° C.) A: 20 min or less, B: 30 min or less, C: 40 min or less, D: more than 40 min | | A | D | B |
| | storage stability (Tg rise after 60 day storage at 40° C. [° C.]) | | 24 | 1 | 5 |
| | storage stability after 1 hour heat treatment at 80° C. (Tg rise after 60 day storage at 40° C. [° C.]) | | 42 | 2 | 6 |
| cured material characteristics | elastic modulus of cured material [GPa] | | 3.7 | 3.7 | 3.4 |
| | deflection of cured material [mm] | | 4.0 | 7.4 | 8.1 |
| CFRP characteristics | 0° bending strength [MPa] | | 1554 | 1563 | 1462 |
| | 90° bending strength [MPa] | | 83 | 112 | 113 |

| | | | Comparative example 9 | Comparative example 10 | Comparative example 11 |
|---|---|---|---|---|---|
| epoxy resin [A1] | [A1]-3: Epicron ® HP-7200 H | | | | |
| [A2] | [A2]-1: Sumiepoxy ® ELM-434 | | 5 | 55 | 40 |
| [A3] | [A3]-1: Epicron ® 830 | | 70 | 20 | |
| | [A3]-2: Epotohto ® YDF-2001 | | 25 | 25 | |
| other | [A]-1: jER ® 828 | | | | 60 |
| | [A]-2: jER ® 1001 | | | | |
| curing agent | [B]-1: DICY7 | | 6.1 | 7.4 | 0.0 |
| curing accelerator | [C]-1: DCMU | | 3.0 | 3.0 | |
| | [C']-3: Cureduct ® P-0505 | | | | 20.0 |
| mixture containing boric ester | [D]-1: Cureduct ® L-07N | | 3.0 | 3.0 | 10.0 |
| thermoplastic resin | [E]-1: Vinylec ® K | | 4.5 | 2.5 | 5.0 |
| Measurements resin composition characteristics | [a]: T(100) [min] | | 65 | 33 | 14 |
| | [b]: T(60) [hrs] | | 33 | 22 | 13 |
| | average epoxy equivalent over all epoxy resins [g/eq] | | 196 | 163 | 157 |
| | presence of tri- or higher functional epoxy resin Y: yes, N: no | | Y | Y | Y |
| | content [parts by mass] of [A1] in total epoxy resin (100 parts by mass) | | 0 | 0 | 0 |
| | average number of functional groups per molecule of [A1] | | — | — | — |
| | content [parts by mass] of [A2] in total epoxy resin (100 parts by mass) | | 5 | 55 | 40 |
| | content [parts by mass] of [A3] in total epoxy resin (100 parts by mass) | | 95 | 45 | 0 |
| | (i) meets requirements [a] and [b]? Y: yes, N: no | | N | N | N |
| | (ii) meets requirements [c] and [d]? Y: yes, N: no | | N | N | N |
| | (iii) meets requirements [c] and [e]? Y: yes, N: no | | N | N | N |
| prepreg characteristics | curability (pressed, heated at 130° C.) A: 20 min or less, B: 30 min or less, C: 40 min or less, D: more than 40 min | | D | B | A |
| | storage stability (Tg rise after 60 day storage at 40° C. [° C.]) | | 1 | 7 | 18 |
| | storage stability after 1 hour heat treatment at 80° C. (Tg rise after 60 day storage at 40° C. [° C.]) | | 2 | 8 | 43 |
| cured material characteristics | elastic modulus of cured material [GPa] | | 3.7 | 4.0 | 3.8 |
| | deflection of cured material [mm] | | 7.4 | 6.6 | 3.5 |
| CFRP characteristics | 0° bending strength [MPa] | | 1557 | 1610 | 1586 |
| | 90° bending strength [MPa] | | 111 | 100 | 73 |

The epoxy resin composition according to the present invention has very high storage stability, gives cured material having good mechanical characteristics, and accordingly can serve favorably as matrix resin of fiber reinforced composite material. The prepreg and fiber reinforced composite material according to the present invention can be used favorably for sport applications, general industrial applications, and aerospace applications.

The invention claimed is:
1. An epoxy resin composition comprising:
100 parts by mass of [A] an epoxy resin;
[B] dicyandiamide, present in an amount such that 0.3 to 1.2 equivalents of active hydrogen groups of [B] are present per equivalent of epoxy groups in the epoxy resin composition;
1 to 8 parts by mass of [C] aromatic urea; and
0.1 to 8 parts by mass of [D] a boric ester;
wherein the epoxy resin composition fulfills condition (i) and at least one of conditions (ii) and (iii) given below:

(i) to meet requirement [a] and requirement [b],
(ii) to meet requirement [c] and requirement [d], and
(iii) to meet requirements [c] and requirements [e],
where requirements [a] to [e] are as follows:
[a]: a time period after reaching 100° C. until reaching a peak top in a heat flow curve is 60 minutes or shorter when the epoxy resin composition is analyzed in a nitrogen stream at a constant temperature of 100° C. using a differential scanning calorimeter,
[b]: a time period after reaching 60° C. until reaching a peak top in a heat flow curve is 25 hours or longer when the epoxy resin composition is analyzed in a nitrogen stream at a constant temperature of 60° C. using a differential scanning calorimeter,
[c]: an average epoxy equivalent over all epoxy resins is 165 g/eq or more and 265 g/eq or less,
[d]: [A] contains 10 to 50 parts by mass of an epoxy resin [A1] that is represented by formula (I) and/or formula (II):

[Chemical compound 1]

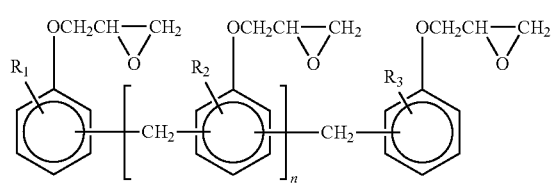

(I)

wherein $R^1$, $R^2$, and $R^3$ each are a hydrogen atom or a methyl group, and n is an integer of 1 or greater,

[Chemical compound 2]

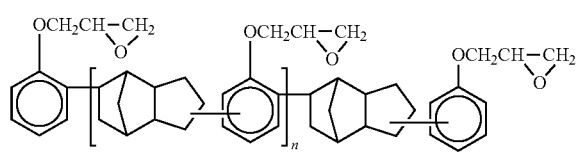

(II)

wherein n is an integer of 1 or greater, and

[e]: [A] contains 10 to 50 parts by mass of a tri- or higher functional glycidyl amine type epoxy resin [A2].

2. An epoxy resin composition as set forth in claim 1, wherein conditions (i), (ii), and (iii) are fulfilled.

3. An epoxy resin composition as set forth in claim 1, wherein [A] further contains 20 to 90 parts by mass of a bisphenol F type epoxy resin [A3].

4. An epoxy resin composition as set forth in claim 1 that, when cured by heating at 130° C. for 2 hours, gives a cured resin having a bending elastic modulus of 3.5 GPa or more.

5. An epoxy resin composition as set forth in claim 1, wherein at least conditions (i) and (ii) are fulfilled, and [A1] is represented by formula (II).

6. An epoxy resin composition as set forth in claim 1, wherein [C] contains toluene bis-dimethylurea.

7. A prepreg comprising the epoxy resin composition as set forth in claim 1 and carbon fiber.

8. A fiber reinforced composite material produced by curing the prepreg as set forth in claim 7.

* * * * *